United States Patent [19]

Darrieux

[11] Patent Number: 4,710,412
[45] Date of Patent: Dec. 1, 1987

[54] MANUFACTURE OF FRAMES

[75] Inventor: Jean-Louis Darrieux, Merignac, France

[73] Assignee: Societe Nationale Industrielle et Aerospatiale, Paris, France

[21] Appl. No.: 739,266

[22] Filed: May 29, 1985

[30] Foreign Application Priority Data

May 30, 1984 [FR] France .................. 84 08524

[51] Int. Cl.$^4$ .................. B27N 5/02; B64D 27/00; B64D 41/00
[52] U.S. Cl. ...................................... 428/36; 428/35; 244/54; 244/58
[58] Field of Search ............ 428/35, 36; 244/54, 244/58

[56] References Cited

U.S. PATENT DOCUMENTS

| | | | |
|---|---|---|---|
| 3,509,614 | 5/1970 | Eldred | 29/159 |
| 4,495,231 | 1/1985 | Laskaris et al. | 428/36 |
| 4,544,588 | 10/1985 | Schauf | 428/35 |
| 4,568,582 | 2/1986 | Kikuzawa et al. | 428/35 |

FOREIGN PATENT DOCUMENTS

| | | |
|---|---|---|
| 0124503 | 7/1985 | Japan . |
| 6903776 | 3/1969 | Netherlands . |
| 2093397 | 9/1982 | United Kingdom . |

Primary Examiner—John E. Kittle
Assistant Examiner—Patrick J. Ryan
Attorney, Agent, or Firm—Armstrong, Nikaido, Marmelstein & Kubovcik

[57] ABSTRACT

A method of fabricating complex frames, e.g. for engines and aircraft comprises forming the principal components of the frame from resin-bonded filamentary material and securing them together, each of the principal components being formed by a method which includes the step of winding the filamentary material about a former having longitudinal axis and impregnating the material with a hardenable resin. One or more of the components so made may form part of the former for one or more of the other components. The method of forming the individual components may further include the step of axially dividing the element which is made by winding filamentary material about a former and impregnating the material with hardenable resin.

1 Claim, 14 Drawing Figures

MANUFACTURE OF FRAMES

Complex structures and shapes are in general complicated to manufacture since they employ a large number of components which themselves are not always parts of simple design but on the contrary result in their shape and cross-section from the calculations defining the piece.

Structures of this type are found in what will be called frames, that is to say, an assembly of members which form the support or the essential portion of a constructions or of an appliance (it might equally well be called the skeleton). The complexity of a frame is revealed by examination of its structure, that is to say, of the way in which the portions which compose the frame are arranged with respect to one another.

Thus there is always in a frame an essential supporting or connection function to be ensured the mechanical characteristics of which are accurately defined.

A number of types of manufacture exist for such frames. The most conventional construction consists in an assembly of individual metal parts using fastenings of any convenient kind such as welds, screws and rivets. The disadvantage of this method of manufacture lies in its high cost resulting from a heavy consumption of material and time due for example to machining of the parts, assembly and difficulty of automation.

The present invention involves substituting for this conventional method of manufacture the manufacture of a frame from synthetic materials of the fibrereinforced resin type, the essential reason for which is necessity of saving weight. The parts forming the structure are accordingly designed in order to be able to be "moulded" or shaped over forms and counter-forms which are wrapped with a covering of fabric made from fibres and impregnated with polymerizable resin. The saving in weight is appreciable (e.g. of the order of 50% for a given frame, all things being otherwise equal or comparable) but the cost of manufacture had not noticeably diminished and may even be slightly higher than that of the conventional construction. It must however be observed that for frames intended for aircraft engines for example, the saving in weight achieved may justify a slight increase in the cost of production.

The invention enables the two imperatives of lightness and relatively low cost to be allied, which firstly preserves to the method of manufacture according to the invention a wide application in the domaine of aeronautics and space, and secondly enables this method to find other applications in sectors in which restriction of the cost price is at least as important as that of the weight.

According to the invention in one aspect there is provided a method of manufacturing a frame from a plurality of components which are secured together, comprising forming each of a number of said components from filamentary material impregnated with a hardenable resin by a slip which includes winding the filamentary material about the longitudinal axis of an appropriately shaped mandrel.

Certain of said elementary pieces are assembled in sub-assemblies which constitute at least portions of mandrels for the winding of other elementary pieces.

It will be observed finally that the method in accordance with the invention includes phases of machining the blanks obtained by winding filaments directly over the winding mandrels which enable firstly easy removal frm the mould of the shapes obtained and secondly a dimensional preparation of the pieces which are to be assembled.

The invention also provides a frame or the like having a longitudinal axis and consisting of an outer envelope coaxial with the said axis, of an assembly of beams perpendicular to the said axis and of an annular casing for anchoring the ends of the beams inside the said envelope which has cross-bracing reinforcements between the beams. In accordance with the aforesaid method, the beams and reinforcements are the outcome of blanks obtained by the winding of filaments and then machined, the casing consists of two half-casings having a bottom and cylindrical flanges and being the outcome of a blank obtained by the winding of a filament and then machined, the beams and reinforcements are assembled by gluing to the half-casings fitted into one another by their cylindrical flanges and the outer envelope is wound over a mandrel one portion of which consists of the outer face of the aforesaid cylindrical flanges.

It will be recalled that in the techniques of winding or wrapping of a filament, the idea is known of employing any kind of basic material capable of being wound such as glass, silica, Kevlar, carbon, silicon carbide, boron alumino-silicate, alumina. The imparting of rigidity to the product will be obtained by hardening of a binder distributed between the wound fibres which will be either dry or preimpregnated.

The choice of the binder, whether metallic or organic, will depend upon the nature of the fibres and of the characteristics sought for the composite material which it is desire to obtain.

The invention will be better understood during the course of the description given below by way of purely indicative and non-restrictive example which will enable the advantages and secondary characteristics to be drawn from it.

Reference will be made to the attached drawings in which.

Figure 1:
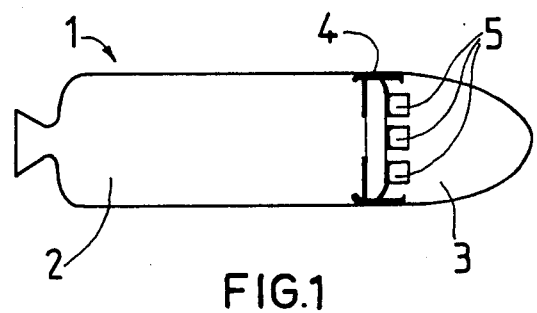
FIG. 1 is a diagram illustrating the arrangment of a frame in an engine and its role of support for items equipment and of connection of the lower and upper stages of the engine.

Referring first to FIG. 1, a ballistic engine 1 is shown, between the propulsive stage 2 and the head or cap 3 of which is an equipment-carrying frame 4. This frame is notionally contained within a cylindrical volume corresponding with the geometry of the engine, the longitudinal axis of symmetry of which is that of the engine. Its functions are to support three pieces 5 of equipment of equal mass during the flight phase and to ensure the connection between the lower and upper subassemblies 2 and 3 respectively thus guaranteeing the cohesion of the whole of the engine during handling and flight.

Figure 2:
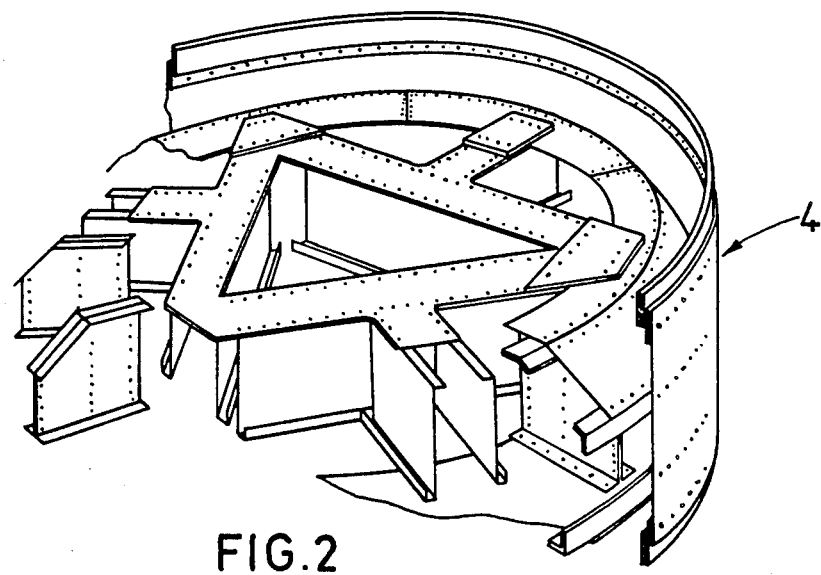
FIG. 2 is a partial view of the frame from FIG. 1 such as is capable of being produced with a conventional technique of cutting and assembling of metal parts.

FIG. 2 is a perspective view of a frame 4 produced according to conventional techniques by means of sheets of light material cut out, shaped and assembled by screws and rivets onto metal frames machined in heavygauge sheet metal.

Figure 3:
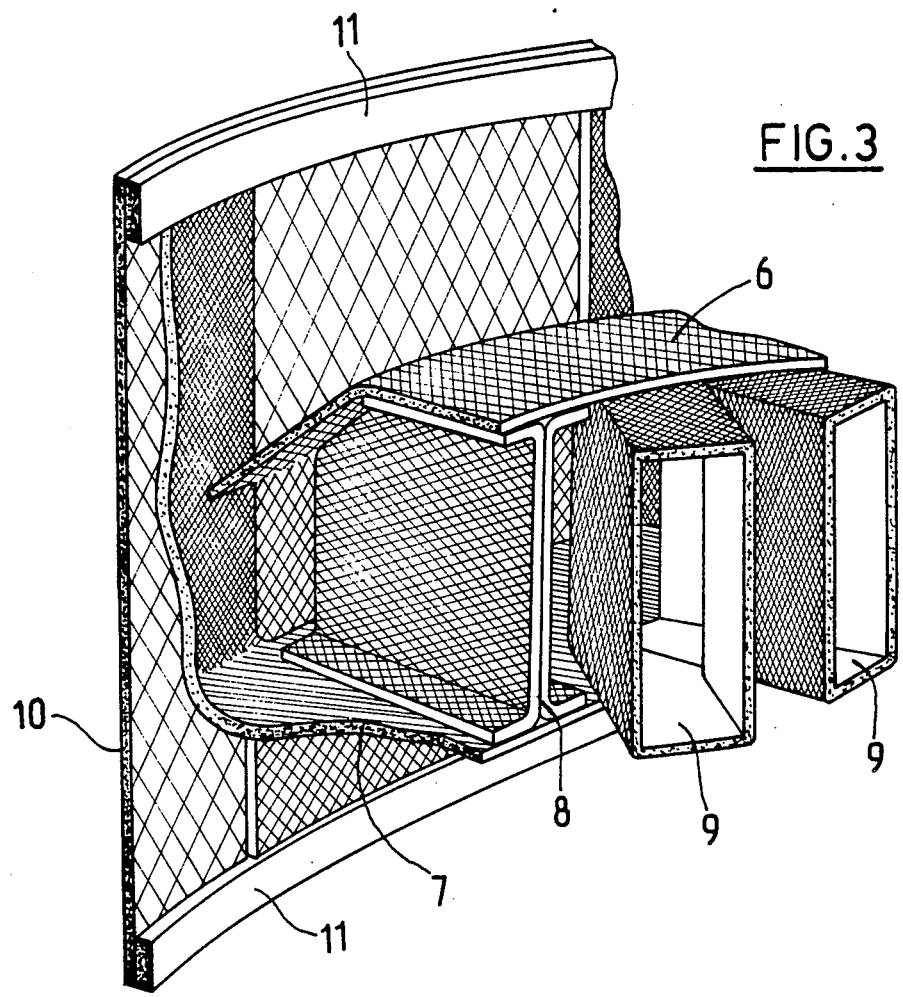
FIG. 3 illustrates by a view in partial detail the splitting up of the frame according to FIG. 1 into members which can be produced by winding a filament or fabric made from filamentary material.

FIG. 3 shows how the frame illustrated in Figure 2 may be split up into a minimum number of pieces which may be manufactured from a fabric made from filamentary material or by winding a filament. Thus the frame 4 comprises essentially two casings 6 and 7 between which are arranged reinforcements 8 and the adjacent ends of beams 9 forming a triangulated system. The whole is seated in a sleeve 10 which includes at each axial end of it a ring member 11.

Figure 4:
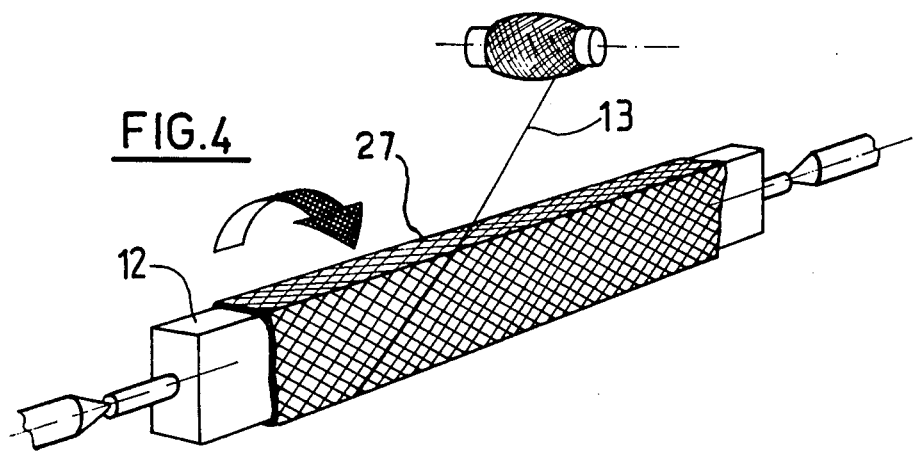
FIG. 4 shows a diagrammatically an operation for winding a filament which enables reinforcing and cross-pieces to be obtained for the frame as FIG. 3.

FIG. 4 to 10B show that effectively all of the pieces constituting the frame 4 may be the outcome of winding a filament. Thus FIG. 4 shows that, starting from a mandrel 12 of rectangular cross-section, a beam 9 as aforesaid may be produced by winding a blank 27 by means of a thread 13 over this mandrel (with the application of polymerisable resin). The hollow piece which is the outcome of this will of course be removable from the mould in a known manner (taper on the mandrel, or employment of stripping agents). It will be brought to the correct length by cutting in pieces and/or bevelling. The aforesaid triangulated frame will then be able to be formed by gluing, one of the angles 9a being represented in FIG. 4B.

Figure 4A:
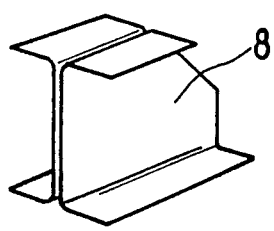
FIGS. 4A and 4B illustrate these pieces obtained after machining the product from FIG. 4, FIGS. 5, 6A and 6B illustrate the making of the casing pieces of the frame.
Figure 4B:
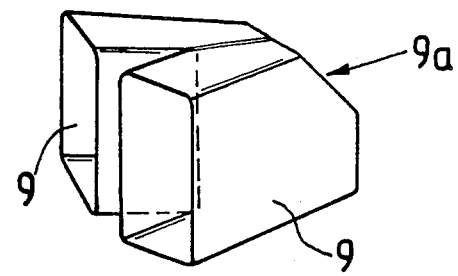

In FIG. 4A are shown the reinforcements 8 which are made from the blank shown in FIG. 4, the blank having been split longitudinally and the two portions being then glued back to back and brought to the correct length by sawing or cutting.

These blanks 27 may alternatively beproduced by covering the mandrel with cloth or braid whilst the pieces 8,9 might be metallic and assembled by any known means such as screwing or welding.

Figure 5:
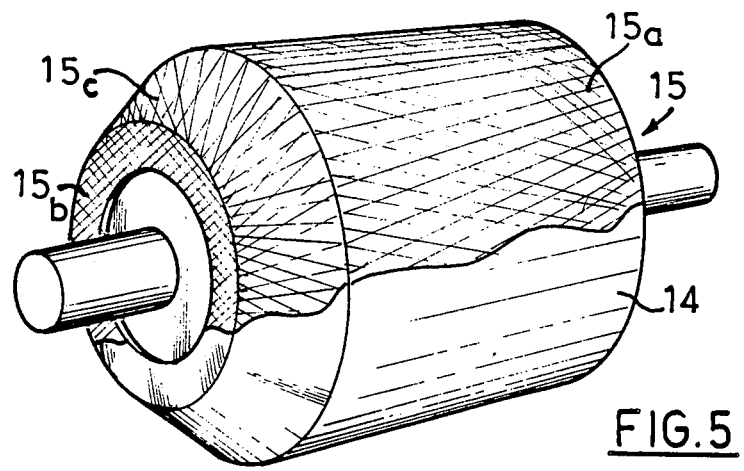

FIG. 5 shows a mandrel 14 upon which is wound a casing 15 which comprises a sleeve 15a and a bottom 15b connected to the sleeve by a frustoconical portion 15c.

Figure 6A:
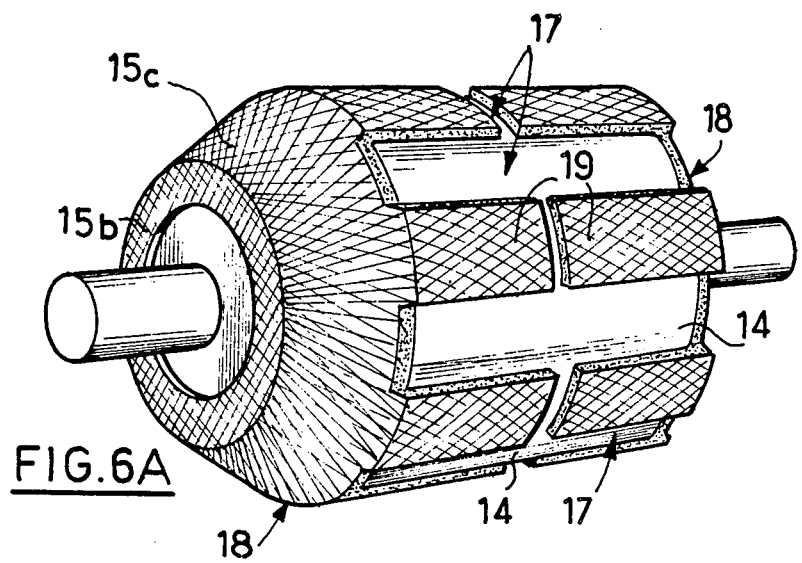
Figure 6B:
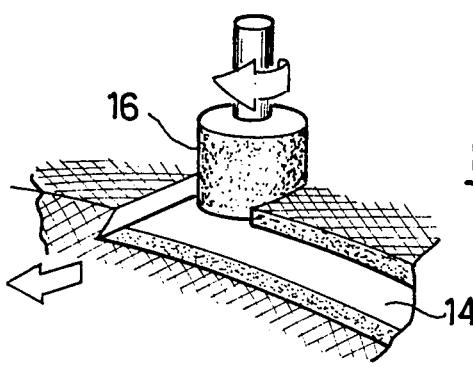

FIG. 6A shows that with a suitable tool 16 of the milling cutter or grindstone type a number of slots 17 are cut in the sleeve 15a of the piece 15 until the mandrel 14 is uncovered, the manner of cutting being shown in FIG. 6B. From this Figure it may be seen that there are thus formed two identical casings 18 having walls 15b, 15c which are substantially radial and flanges 19 proceeding from the cutting of the sleeve 15a into portions which are equal with another and equal with the hollows which separate them. It will be observed in addition that this cutting out enables the two casings 18 to be removed from the mould.

Figure 7:
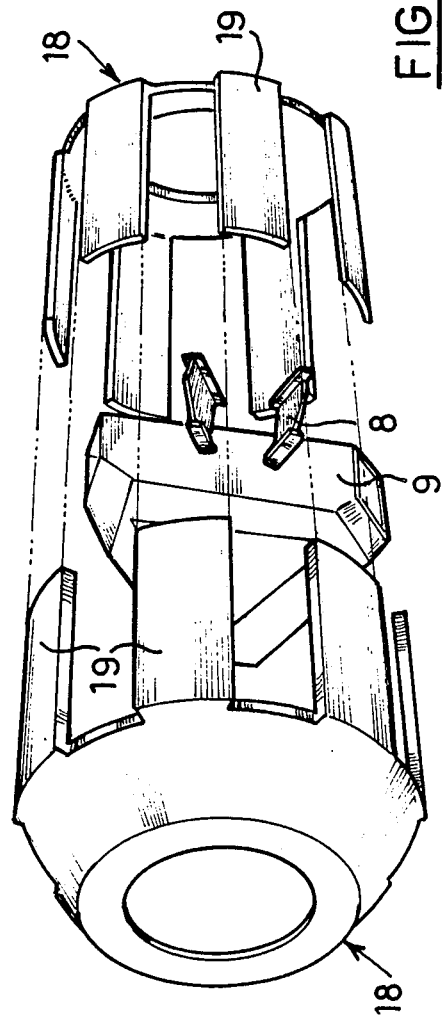
FIG. 7 shows the erection of the aforesaid elementary pieces.
Figure 8:
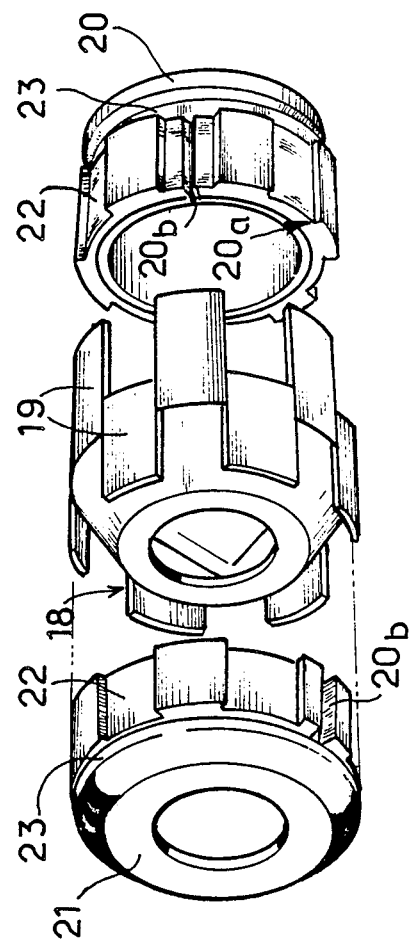
FIG. 8 illustrates the composition of the mandrel for winding the final sleeve.
Figure 9:
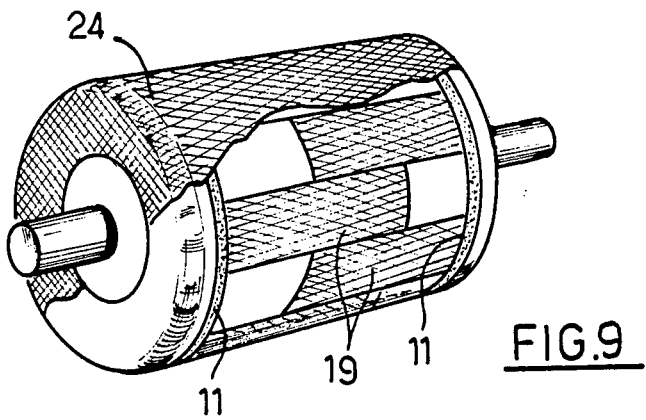
FIG. 9 shows the winding of this sleeve.

FIG. 7 shows how the constituent pieces (the triangulated structure of beams 9, reinforcements 8 and casings 18) are presented to one another in order to assemble them after having coated the surfaces shown in dotted lines with a film of glue. The completed subassembly appears in FIG. 8 where it is completed by the addition of two end mandrels 20, 21 which have longitudinal slots 22 for receiving the ends of the flanges 19 and for each of them an end rebate 23 in which will either be placed a prefabricated ring member 11 of metal or of composite material or have wound a ring prior to the winding of an envelope 24 as appears in FIG. 9. This envelope forms the blank of the sleeve 10 as in FIG. 3 which is obtained as shown in FIG. 10A by separating (e.g. by milling or grinding as at 25 directly over the portions of mandrel 20, 21) the axial portion of the blank 24 from its end cups.

In accordance with another characteristic of the invention and by means of suitable law of winding it is possible by making the inclination of the fibres vary with respect to the axis of the mandrel, to leave zones (not shown) which are empty of material during the winding of th envelope 24. Without being led to cutting fibres these zones will advantageously be employed for arranging doors, portholes or any other opening in the collars 10.

Figure 10A:
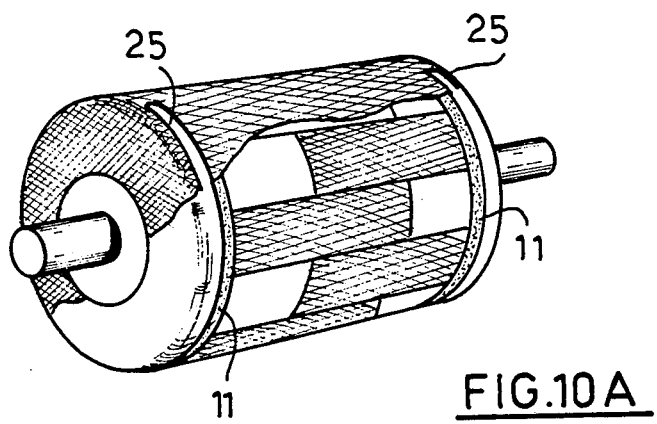
FIGS. 10A and 10B illustrate the completion of the frame.
Figure 10B:
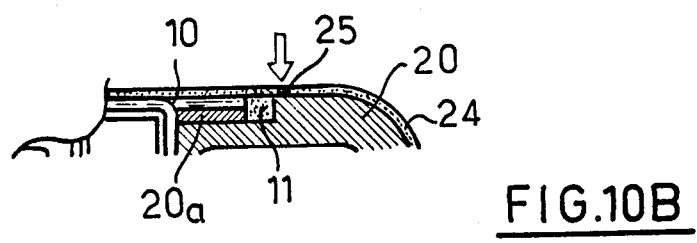

FIG. 10B shows by an axial section through one end of FIG. 10A that in fact the mandrels in question such as 20 and 21 have a removable ring 20a bearing hollows 22, which can contract because of being split at 20b (FIG. 8) in order to be dismounted by passing in particular underneath the ring member 11.

The embodiment given above of a frame for carrying equipment for a ballistic engine, finds numerous variants of application and in numerous domaines. In fact one of its qualities is to offer, all things otherwise being equal, a saving in weight of the order of 50% with respect to the frame represented in FIG. 2. From this quality comes a quite special aptness of the method of the invention and of the components which are the outcome of it, for the aeronautical and space industry.

Furthermore, besides this saving in weight, it has been found that the cost of the frame in accordance with the invention was about 50% less than that of the frame in FIG. 2. Indeed the method in accordance with the invention may be put into effect by simple rotary machines with mandrels which are not consumable and with well known and cheap materials. The method of winding a filament enables the losses of raw material to be limited to a maximum extent and offers great flexibility, lending itself to relatively simple automation, which are sufficient factors in reduction of cost to make the invention of usefulness in branches of industry.

It will be understood that a large number of simple mechanical pieces such as angles, arches, H-, channel-, or T-sections of constant or decreasing area, having a curved or straight generatrix may be obtained by the technique of winding a filament, associated with carefully considered cutting of the blank.

The invention finds important applications in the domaine of the manufacture of complex structures for example for aeronautics, motor cars, vehicles in general, containers, shelters and three-dimensional framework structures.

I claim:

1. A composite frame having a longitudinal axis of symmetry and comprising an outer sleeve coaxial with said axis, an assembly of elongate elements disposed substantially perpendicularly to the said axis, an annular casing anchoring said elongate elements to said outer sleeve, and reinforced elements connecting the beams together, said sleeve, said casing and said elements being hollow and being formed from filamentary material impregnated with hardenable resin, said casing comprising two axial halves bonded together end to end and each including a cylindrical flange portion concentric with said axis, said elongate and reinforcing elements being disposed within and bonded to said halves of the casing, and said outer sleeve being formed about said cylindrical flange portions.

* * * * *

UNITED STATES PATENT AND TRADEMARK OFFICE
CERTIFICATE OF CORRECTION

PATENT NO. : 4,710,412

DATED : December 1, 1987

INVENTOR(S) : Jean-Louis DARRIEUX

It is certified that error appears in the above-identified patent and that said Letters Patent is hereby corrected as shown below:

On the cover page, Item [73], "Societe Nationale Industrielle et Aerospatiale" should read --Aerospatiale, Societe Nationale Industrielle--.

Signed and Sealed this

Second Day of August, 1988

*Attest:*

DONALD J. QUIGG

*Attesting Officer*  *Commissioner of Patents and Trademarks*